(12) United States Patent
Morf

(10) Patent No.: US 7,857,889 B2
(45) Date of Patent: Dec. 28, 2010

(54) METHOD FOR PURIFYING EXHAUST GASES FROM A WASTE INCINERATION PLANT

(75) Inventor: Philipp Oliver Morf, Zürich (CH)

(73) Assignee: Von Roll Umwelttechnik AG (CH)

( * ) Notice: Subject to any disclaimer, the term of this patent is extended or adjusted under 35 U.S.C. 154(b) by 236 days.

(21) Appl. No.: 12/040,680

(22) Filed: Feb. 29, 2008

(65) Prior Publication Data
US 2008/0210085 A1    Sep. 4, 2008

(30) Foreign Application Priority Data
Mar. 2, 2007    (EP)    ............................ 07004300

(51) Int. Cl.
*B01D 53/02* (2006.01)

(52) U.S. Cl. ........... 95/13; 95/90; 95/107; 95/108; 95/132; 95/137; 96/111

(58) Field of Classification Search .............. 95/13, 95/90, 107, 108, 132, 137; 96/111
See application file for complete search history.

(56) References Cited

U.S. PATENT DOCUMENTS

| 2,646,171 | A | * | 7/1953 | Weiss | ............... | 562/554 |
| 3,954,948 | A | * | 5/1976 | Sakowski | ............... | 423/474 |
| 3,974,784 | A | * | 8/1976 | Greenberg | ............... | 588/314 |
| 4,885,139 | A | * | 12/1989 | Sparks et al. | ............... | 422/169 |
| 4,973,458 | A | * | 11/1990 | Newby et al. | ............... | 423/244.07 |
| 5,006,322 | A |   | 4/1991 | Schuetzenduebel et al. | | |
| 5,456,891 | A | * | 10/1995 | Fattinger et al. | ............... | 423/210 |
| 5,659,110 | A | * | 8/1997 | Herden et al. | ............... | 423/219 |
| 2003/0019356 | A1 | * | 1/2003 | Herden et al. | ............... | 95/108 |
| 2005/0238549 | A1 | * | 10/2005 | Hammel | ............... | 422/168 |

FOREIGN PATENT DOCUMENTS

| DE | 4333481 | 2/1995 |
| EP | 0173403 | 3/1986 |
| EP | 1537905 | 6/2005 |
| JP | 2000-107562 | 4/2000 |

OTHER PUBLICATIONS

European Search and Examination Report of European Application EP 07 004 300.5, mailed Jul. 5, 2007.
Lueger, Lexikon der Technik, Stuttgart 1970, vol. 16, p. 601 et seq.

* cited by examiner

*Primary Examiner*—Robert J Hill, Jr.
*Assistant Examiner*—Christopher P Jones
(74) *Attorney, Agent, or Firm*—Hershkovitz & Associates, LLC; Abraham Hershkovitz

(57) ABSTRACT

The present disclosure relates to a method for purifying exhaust gases from a waste incineration plant by utilizing a sorption method in a circulating fluidized bed. According to the disclosure, the mass flow of the supplied fresh sorbent is regulated as a function of the concentration of fresh sorbent and/or at least one sorbed pollutant in the recirculated solid matter.

16 Claims, 2 Drawing Sheets

METHOD FOR PURIFYING EXHAUST GASES FROM A WASTE INCINERATION PLANT

CROSS-REFERENCE TO RELATED APPLICATIONS

The present application claims priority under 35 U.S.C. 119 of European Patent Application No. 07 004 300.5, filed on Mar. 2, 2007, the disclosure of which is expressly incorporated by reference herein in its entirety.

BACKGROUND OF THE INVENTION

The present invention relates to a method for purifying exhaust gases from a waste incineration plant by utilizing a sorption method in a circulating fluidized bed as well as an exhaust gas purification system.

In the case of waste incineration, the exhaust gases being generated during that process are usually purified by separating the pollutants contained therein, such as HCl, HF, $SO_2$, nitrogen oxides and dioxin as well as dusts, in an exhaust gas purification system.

A possible method for separating pollutants such as HCl, HF, $SO_2$ and dioxins from the exhaust gases is the dry sorption of the pollutants by utilizing a sorbent.

For this, a sorbent is usually introduced into a fluidized bed reactor, where it is put in contact with the exhaust gas in a circulating fluidized bed. The pollutants thereby sorb to the sorbent. Downstream from the fluidized bed reactor is a solids separator. Solid matter carried along in the exhaust gas and consequently also sorbent loaded with pollutant is separated therein. The separated solid matter is either discharged or returned to the fluidized bed reactor.

A corresponding method is described in the document EP-A-1 537 905. There, a first addition of the additive serving as sorbent takes place to the fluidized bed or following the fluidized bed ahead of the separation and a second addition ahead of the fluidized bed to an exhaust gas duct leading to the fluidized bed.

A number of methods have been suggested for the regulation of the amount of sorbent to be supplied as described below.

JP-A-2000107562 describes a method for the regulation of the amount of absorbing powder to be added by determination of the backwash cycles of a bag filter.

EP-A-0 173 403 describes a method for the regulation of the amount of sorbent to be introduced into an exhaust gas stream, wherein the HCl value is used as reference variable, from which the setpoint value is calculated in conjunction with the measured amount of exhaust gas and a temperature dependent stoichiometry value. In this method, the also determined $SO_2$ content can be included as additional correction. The document does not clearly indicate if the HCl concentration and the $SO_2$ concentration is measured in the raw gas or in the pure gas.

A control method in which only the HCl concentration in the pure gas is measured ("feedback" control) has the disadvantage that a required sorbent supply does not take place until an increased pollutant content in the emitted clean gas has already been detected. In order to meet this disadvantage, methods were suggested, in which in addition to the above described measurement in the pure gas, also the HCl and $SO_2$ concentrations in the raw gas are measured, by way of which the theoretically required amount of sorbent can be determined (combined "feedforward/feedback" control).

However, it has been shown that the effectively required amount of sorbent can only be poorly determined by way of the measured concentrations of HCl and $SO_2$. This relates to the fact that the circulating solid matter, which together with the actual sorbent comprises further solid components such as fly ash or fuel particles, has a not negligible residual sorption capacity. It is, for example, possible that in the case of a relatively low content of pollutants prior to the sorption, these are not completely separated despite a large amount of fresh sorbent being supplied, since the residual sorption capacity of the circulating solid matter is low and the amount of sorbent required for the treatment of pollutant peaks cannot be supplied to the system quickly enough. On the other hand, it is possible that in the case of a high residual sorption capacity of the circulating solid matter, the supply of fresh sorbent is not even required at all when the pollutant content prior to the sorption is relatively high. As a result of the composition, which varies greatly depending on the composition of the combusted waste, of the exhaust gas and of the entrained solids, the residual sorption capacity can not be determined numerically. If hydrated lime is used as sorbent, then the sorption capacity is additionally influenced by carbonation reactions, which makes a numerical determination of the residual sorption capacity completely impossible.

A further disadvantage of the existing methods for the purification of exhaust gases from waste combustion is found in their lack of operational reliability. The reason for this is that the chloride content of the circulating solid matter strongly fluctuates and, for a specific content in the solid matter, leads to sticking and caking, which, in the extreme case, can completely clog the exhaust gas purification system.

SUMMARY OF THE INVENTION

According to one aspect of the present invention, there is provided a method of the initially mentioned type, wherein the sorbent is optimally utilized and which, at the same time, ensures a high operational reliability.

The method according to an aspect of the invention is characterized in that the mass flow of the supplied fresh sorbent is regulated as a function of the concentration of fresh sorbent and/or at least one sorbed pollutant in the recirculated solid matter.

The residual sorption capacity of the recirculated solid matter is thus taken into account during the regulation of the supply of fresh sorbent. This allows for a significantly more accurate determination of the effectively required mass flow of fresh sorbent than has been the case in the methods known to date. The sorbent is thus optimally utilized, which enables the consumption thereof to be kept to a minimum.

In addition, according to a method of the present invention, the supply of fresh sorbent can be regulated in such a way that the proportion of chlorides during the purification of the exhaust gases is permanently maintained below the critical threshold value for the sticking of the solid particles. This contributes significantly to the operational reliability of the method.

The method of the present invention comprises not only dry sorption methods, but also semi-dry sorption methods.

In this method, the sorbent is available in the form of a circulating fluidized bed, which is generated as a result of the solid particles contained in the exhaust gas, together with the supplied sorbent, being brought into a fluidized state by the upwardly directed exhaust gas stream.

Hydrated lime ($Ca(OH)_2$) is preferably used as sorbent for the method of the present invention. This usually has a purity grade of at least 92% and a specific surface of at least 15 $m^2/g$.

However, a plurality of further sorbents, such as sodium bicarbonate ($NaHCO_3$), Spongiacal® (Rheinkalk) or Sorbalit® (Märker Umwelttechnik GmbH), is also conceivable. According to the invention, a single sorbent or a mixture of different sorbents can be used.

The pollutants contained in the exhaust gas are separated by way of chemical reaction with the sorbent in the circulating fluidized bed.

If hydrated lime is used as sorbent, the pollutants $SO_2$, HCl and HF react in accordance with the following reaction equations to the corresponding salts:

$$Ca(OH)_2 + H_2O + SO_2 \rightarrow CaSO_3 \text{(Calcium sulfite)} + 2H_2O$$

$$Ca(OH)_2 + 2HCl \rightarrow CaCl_2 \text{(Calcium chloride)} + 2H_2O$$

$$Ca(OH)_2 + 2HF \rightarrow CaF_2 \text{(Calcium fluoride)} + 2H_2O$$

In these reactions, the temperature for the pollutant separation is preferably approx. 145° C.

Activated carbon (open-hearth furnace coke) is usually also present in the circulating fluidized bed, onto which pollutants are additionally adsorbed and separated from the exhaust gas.

Apart from the sorbent and the activated carbon, as well as the pollutants sorbed to sorbent and activated carbon, the recirculated solid matter generally also comprises fuel particles and fly ash from the firing portion of the waste incineration plant. According to the invention, the mass flow of the supplied fresh sorbent is regulated as a function of the concentration of fresh sorbent and/or at least one sorbed pollutant in the recirculated solid matter.

According to one preferred embodiment of the method according to the invention, the concentration of the respective component(s) in the recirculated solid matter is determined in a substantially continuous manner. According to the invention, the concentration of fresh (unloaded) sorbent, in particular hydrated lime, and/or of sorbed pollutant, in particular chloride, sulfite and/or fluoride, is determined in this way. The supply of the fresh sorbent is adjusted on the basis of the determined concentration of the respective component(s).

The quickest possible reaction to system changes is ensured by the substantially continuous determination of the concentration of the fresh sorbent and/or of the sorbed pollutant in the recirculated solid matter.

In a particularly preferred embodiment, the determination is carried out by utilizing a Fourier Transform near-infrared spectrometer (FT-NIR spectrometer). This enables a continuous quantitative analysis of the recirculated solid matter. The analysis can be carried out in-situ by utilizing a probe disposed in the exhaust gas purification system.

Alternatively to the analysis in-situ, the determination of the concentration of the respective component(s) can be carried out using a sample of solid matter withdrawn from the circulation by utilizing a small cyclone. In this case, the determination takes place batch-wise. If the sample withdrawal takes place in short time intervals, it is possible to carry out a quasi-continuous determination with this embodiment.

A conventional cyclone, such as is known to a person skilled in the art, for example from Lueger, Lexikon der Technik, Stuttgart 1970, vol. 16, p 601 et seq., can be used as cyclone. Preferably, the solids sample is collected in a collection container capable of being automatically emptied. Subsequent to the determination according to the invention, the solids sample is automatically returned to the circulation.

In a further preferred embodiment, in addition to the mass flow of the supplied fresh sorbent, also the mass flow of the solid matter discharged from the circulation is regulated as a function of the concentration of the fresh sorbent and/or of the at least one sorbed pollutant in the recirculated solid matter. In this way, it can be avoided that solid matter having depleted sorption capacity continues to be circulated. In general, the discharging of the solid matter from the circulation is carried out using a discharging device provided for this purpose.

It is furthermore preferable that the mass flow of the supplied fresh sorbent and optionally the mass flow of the solid matter discharged from the circulation is also regulated as a function of the concentration of HCl and/or $SO_2$ in the raw gas and in the pure gas. The embodiment has the advantage that information on the pollutant content in the raw gas and in the pure gas is obtained directly in this way. This additional information enables furthermore a fine adjustment of the inventive regulation of the mass flow of the supplied fresh sorbent and optionally of the mass flow of the solid matter discharged from the circulation.

In addition there can be further regulating circuits:

In a first further regulating circuit, the pressure loss through the fluidized bed in the reactor is monitored and the mass flow of solid matter recirculated into the fluidized bed reactor continuously regulated in order to maintain a constant inventory of bed material in the fluidized bed reactor.

In a second further regulating circuit, the exhaust gas temperature in the fluidized bed reactor is regulated by utilizing water injection.

In addition to the described methods, the present invention also relates to an exhaust gas purification system for the purification of exhaust gases from a waste incineration plant by utilizing a sorption method in a circulating fluidized bed.

The exhaust gas purification system of the present invention comprises both dry sorption exhaust gas purification systems or semi-dry sorption exhaust gas purification systems. As an example for a semi-dry sorption exhaust gas purification system we may mention the Turbosorp® reactor (Austrian Energy & Environment/Von Roll Umwelttechnik AG).

The exhaust gas purification system according to the invention has a fluidized bed reactor and an apparatus for returning solid matter into the fluidized bed reactor. The latter are usually present in the form of a conventional solids separator as known to a person skilled in the art.

The exhaust gas purification system is characterized in that it also has an apparatus for regulating the supply of fresh sorbent as a function of the concentration of fresh sorbent and/or at least one sorbed pollutant in the recirculated solid matter.

Generally, the exhaust gas purification system comprises for this purpose an analysis device for determining the concentration of the component(s) in the recirculated solid matter. Particularly preferably, this device is an FT-NIR spectrometer.

Moreover, the exhaust gas purification system of the present invention can comprise a cyclone for the withdrawal of samples of the recirculated solid matter for determining the concentration of fresh sorbent and/or at least one sorbed pollutant. In this embodiment, the cyclone is preferably disposed on a connection duct leading from the fluidized bed reactor to the solids separator. Because of the fact that the connection duct is free from caking of the solid matter, it is ensured that the withdrawn solids sample is homogeneous. In this embodiment, the analysis device is preferably connected with the cyclone.

In order to maintain the temperature in the fluidized bed reactor constant at a specific value, water injection can additionally be provided. Depending on the sorbent used and depending on the pollutant composition, the temperature can be varied in such a way that the sorption is optimal. The temperature in the exhaust gas purification system is preferably maintained at a value of approx. 145° C.

The exhaust gas purification systems according to the invention allow a volume flow of up to 200,000 $m_n^3/h_{feucht}$ ($m_n^3$=normal cubic meters, where normal conditions are understood to mean a temperature of 273.15 K (0° C.) and a pressure of 101.3 kPa). The exhaust gas purification systems are generally designed for exhaust gases having an inlet temperature of from 170° C. to 300° C., in particular 180° C. to 250° C. Process water is usually used as a method for conditioning. The mean flow velocity in the fluidized bed reactor of the exhaust gas purification system is generally approx. 4 m/s. The pressure drop in the exhaust gas purification system is generally of 20 to 25 mbar.

In general, the exhaust gas purification systems are designed for an operation between 60 to 110% load of the preceding combustion system.

Table 1 shows the pollutant content of an exemplary raw gas, which can be purified with the exhaust gas purification system. In the table, the pollutant content is given as nominal daily mean value and as maximum half-hourly mean value. The exemplary raw gas according to Table 1 has an $O_2$ content of 11 vol.-% and a moisture content of 30 vol.-% $H_2O$.

TABLE 1

| Pollutant component | Nominal daily mean value | Maximum half-hourly mean value |
|---|---|---|
| Dust | ≦4000 mg/$m_n^3$ | ≦10000 mg/$m_n^3$ |
| HCl | ≦3500 mg/$m_n^3$ | ≦4500 mg/$m_n^3$ |
| HF | ≦10 mg/$m_n^3$ | ≦25 mg/$m_n^3$ |
| $SO_2$ | ≦600 mg/$m_n^3$ | ≦1000 mg/$m_n^3$ |
| Hg | ≦0.25 mg/$m_n^3$ | ≦0.5 mg/$m_n^3$ |
| Cd and Tl | ≦1 mg/$m_n^3$ | ≦2.5 mg/$m_n^3$ |
| Dioxin | ≦5 mg/$m_n^3$ TEQ* | ≦12.5 mg/$m_n^3$ TEQ* |

*TEQ = Toxicity Equivalent

By purifying the raw gas in the exhaust gas purification system according to the invention, the pollutant content of the pure gas can be reduced to the values indicated in Table 2.

TABLE 2

| Pollutant component | Nominal daily mean value |
|---|---|
| Dust | ≦5 mg/$m_n^3$ |
| HCl | ≦10 mg/$m_n^3$ |
| HF | ≦1 mg/$m_n^3$ |
| $SO_2$ | ≦10 mg/$m_n^3$ |
| Hg | ≦0.03 mg/$m_n^3$ |
| Cd and Tl | ≦0.05 mg/$m_n^3$ |
| Sb, As, Pb, Cr, Co, Cu, Mn, Ni, V, Sn, Se, Te | ≦0.5 mg/$m_n^3$ |
| Dioxin | ≦0.1 mg/$m_n^3$ |

In the case of an optimal operation, the HCl content can be reduced noticeably below 10 mg/$m_n^3$ and the dust content to 2 to 3 mg/$m_n^3$.

The mean consumption of hydrated lime depends on the pollutant loads of the raw gas and the limit values to be complied with.

BRIEF DESCRIPTION OF THE DRAWINGS

The present invention will be explained in more detail with reference to the figures, in which, in purely schematic form.

DESCRIPTION OF THE PREFERRED EMBODIMENTS

Figure 1:
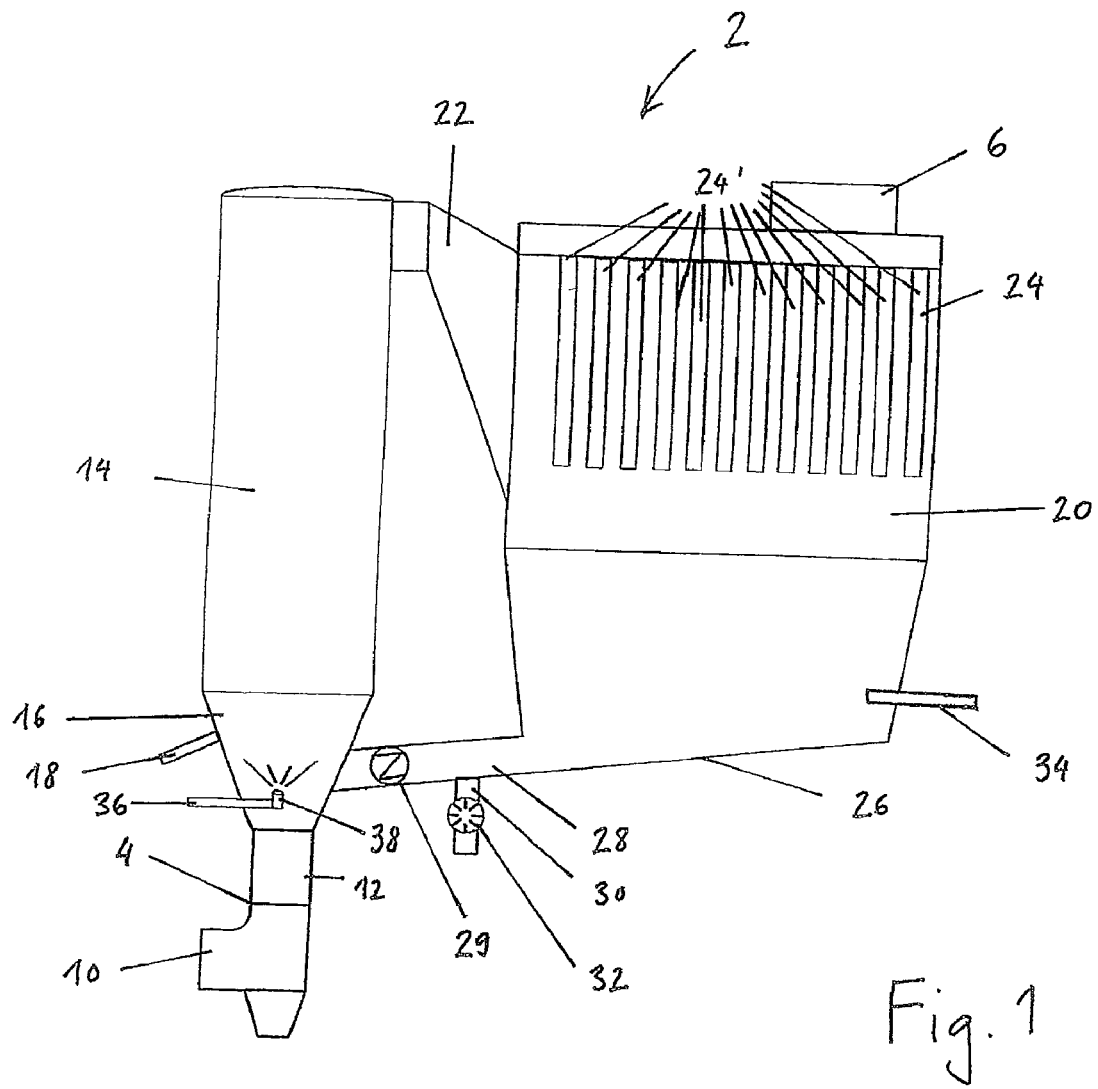
FIG. 1 shows an exhaust gas purification system comprising a fluidized bed reactor and a solids separator arranged downstream thereof for carrying out the method according to the invention.

The exhaust gas purification system 2 shown in FIG. 1 comprises a raw gas inlet 4, through which the exhaust gas generated during the waste combustion is introduced, and a pure gas outlet 6, through which the purified exhaust gas from the exhaust gas purification system 2 is discharged. The raw gas inlet 4 comprises an inlet socket 10 and an inlet duct 12 connected thereto downstream, which opens out into the fluidized bed reactor 14. The fluidized bed reactor 14 has essentially the shape of a hollow cylinder which tapers conically at the inlet side. A sorbent supply line 18 for injecting the sorbent is arranged in the conically tapering region 16. The sorbent is entrained by the exhaust gas flowing into the fluidized bed reactor 14 and forms with the fly ash and the fuel particles carried along in the exhaust gas stream from the waste combustion a circulating fluidized bed (not shown). In the upper region, the fluidized bed reactor 14 opens out into a connection duct 22 leading to the solids separator 20. The solids separator 20 has in the upper region a filter system 24 for separating the solid particles carried along in the exhaust gas stream. The filter system 24 comprises a multiplicity of fabric bag filters 24'. Subsequent to passing the filter system 24, the pure gas obtained is discharged through the pure gas outlet 6. The separated solid particles sediment at the downwardly inclined base 26 of the solids separator 20 and flow along the base 26 into a solids recirculation channel 28. The solids recirculation channel 28 has a metering member 29, via which the volume flow of solid matter returned into the fluidized bed reactor 14 can be adjusted. A discharge duct 30 which comprises a conveying device 32 for discharging solid matter branches off from the return duct 28. An analysis device 34 for determining the concentration of at least one component in the recirculated solid matter is disposed on the solids separator 20. The supply of sorbent per time unit is increased, reduced or held constant, depending on the value obtained during the determination.

To ensure that the temperature in the exhaust gas purification system 2 does not exceed a predetermined value, water can be injected for cooling purposes into the fluidized bed reactor. For this, underneath the sorbent supply line 18, the fluidized bed reactor 14 has a water supply line 36 comprising a nozzle head 38, which leads into the fluidized bed reactor 14.

Figure 2:
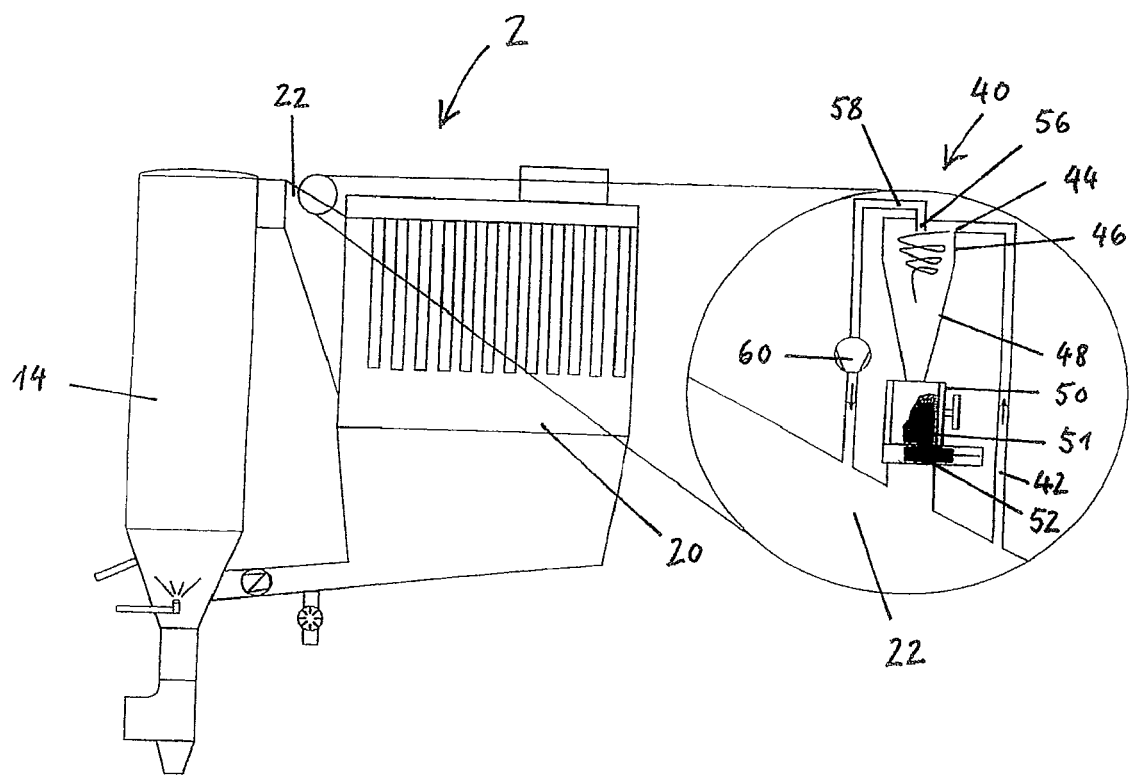
FIG. 2 shows the exhaust gas purification system according to FIG. 1, wherein a cyclone for withdrawing a solids sample, which is shown enlarged in an inset, is arranged between the fluidized bed reactor and the solids separator.

In the exhaust gas purification system 2 shown in FIG. 2, a cyclone 40 is disposed on the connection duct 22 arranged between the fluidized bed reactor 14 and the solids separator 20 for withdrawing a sample of the recirculated solid matter. During the withdrawal, the sample is injected through a withdrawal duct 42 and a tangential inlet nozzle 44 adjoining thereto into the hollow cylindrical upper portion 46 of the cyclone 40. Owing to their mass the solid particles are, as a result of the centrifugal force, guided on spiral paths to a conically tapering lower portion 48 which opens out into a collection container 50. From the solids sample 51 obtained in the collection container 50, the concentration of at least one component is determined using a corresponding analysis device (not shown). In the embodiment shown in FIG. 2, this analysis device is normally connected with the collection container 50 of the cyclone 40. The collection container 50 has a base 52, which can be shifted in such a way that a passage is created between the collection container 50 and the connection duct 22, through which the solid matter in the collection container 50 returns into the connection duct 22 and consequently to the circulation again. The gaseous component being freed from the solids in the cyclone 40 is captured by a central ascending stream and passed through an immersion tube 56 into a cyclone discharge duct 58, through which, controlled by a valve 60, it is returned into the connection duct 22.

The invention claimed is:

1. A method for purifying exhaust gases from a waste incineration plant by utilizing a sorption method in a circulating fluidized bed, the method comprising supplying fresh sorbent into a fluidized bed reactor and putting the fresh sorbent into contact with the exhaust gases in the circulating fluidized bed, whereby pollutants sorb to the fresh sorbent and a raw gas is purified to result in a pure gas, separating solid matter loaded with the pollutants and discharging it from circulation or recirculating it to the fluidized bed reactor, and wherein a mass flow of the supplied fresh sorbent is regulated as a function of a concentration of the fresh sorbent in the recirculated solid matter and/or at least one sorbed pollutant in the recirculated solid matter; wherein an analysis device is used for determining the concentration of the components in the recirculated solid matter.

2. The method as claimed in claim 1, wherein the concentration of at least one of the fresh sorbent and of the at least one sorbed pollutant in the recirculated solid matter is determined in a substantially continuous manner.

3. The method as claimed in claim 2, wherein the determination is carried out by utilizing a Fourier Transform near-infrared spectrometer.

4. The method as claimed in claim 3, wherein the concentration of chloride and optionally of fresh sorbent is determined in the recirculated solid matter.

5. The method as claimed in claim 4, wherein the concentration of fresh sorbent is determined in the recirculated solid matter.

6. The method as claimed in claim 3, wherein the determination is carried out using a sample of solid matter withdrawn from the circulation by utilizing a cyclone.

7. The method as claimed in claim 2, wherein the concentration of chloride and optionally of fresh sorbent is determined in the recirculated solid matter.

8. The method as claimed in claim 7, wherein the concentration of fresh sorbent is determined in the recirculated solid matter.

9. The method as claimed in claim 2, wherein the determination is carried out using a sample of solid matter withdrawn from the circulation by utilizing a cyclone.

10. The method as claimed in claim 2, wherein the mass flow of the solid matter discharged from the circulation is also regulated as a function of the concentration of at least one of fresh sorbent and the at least one sorbed pollutant in the recirculated solid matter.

11. The method as claimed in claim 2, wherein hydrated lime is used as the sorbent.

12. The method as claimed in claim 2, wherein the mass flow of the supplied fresh sorbent and optionally the mass flow of the solid matter discharged from the circulation is also regulated as a function of the concentration of HCl and/or $SO_2$ in the raw gas and in the pure gas.

13. The method as claimed in claim 1, wherein the mass flow of the solid matter discharged from the circulation is also regulated as a function of at least one of the concentration of fresh sorbent and of the at least one sorbed pollutant in the recirculated solid matter.

14. The method as claimed in claim 1, wherein hydrated lime is used as the sorbent.

15. The method as claimed in claim 1, wherein the mass flow of the supplied fresh sorbent and optionally the mass flow of the solid matter discharged from the circulation is also regulated as a function of the concentration of HCl and/or $SO_2$ in the raw gas and in the pure gas.

16. The method as claimed in claim 15, wherein the mass flow of solid matter discharged from the circulation is also regulated as a function of the concentration of HCl and/or $SO_2$ in the raw gas and in the pure gas.

* * * * *